US012794086B2

(12) United States Patent
Kim et al.

(10) Patent No.: US 12,794,086 B2
(45) Date of Patent: Nov. 10, 2026

(54) BATTERY MODULE AND BATTERY PACK INCLUDING THE SAME

(71) Applicant: LG Energy Solution, Ltd., Seoul (KR)

(72) Inventors: Kwangmo Kim, Daejeon (KR); Junyeob Seong, Daejeon (KR); Hyemi Jung, Daejeon (KR); Dayoung Byoun, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 683 days.

(21) Appl. No.: 18/021,420

(22) PCT Filed: Oct. 7, 2021

(86) PCT No.: PCT/KR2021/013770
§ 371 (c)(1),
(2) Date: Feb. 15, 2023

(87) PCT Pub. No.: WO2022/097935
PCT Pub. Date: May 12, 2022

(65) Prior Publication Data

US 2024/0039126 A1 Feb. 1, 2024

(30) Foreign Application Priority Data

Nov. 4, 2020 (KR) ........................ 10-2020-0145982

(51) Int. Cl.
*H01M 50/507* (2021.01)
*H01M 50/211* (2021.01)
(Continued)

(52) U.S. Cl.
CPC ....... *H01M 50/507* (2021.01); *H01M 50/211* (2021.01); *H01M 50/289* (2021.01); *H01M 50/296* (2021.01); *H01M 50/394* (2021.01)

(58) Field of Classification Search
CPC ............. H01M 50/507; H01M 50/211; H01M 50/289; H01M 50/296; H01M 50/30; H01M 50/394
(Continued)

(56) References Cited

U.S. PATENT DOCUMENTS

2012/0328908 A1 12/2012 Han et al.
2015/0111069 A1 4/2015 Han et al.
(Continued)

FOREIGN PATENT DOCUMENTS

CN 110073520 A 7/2019
CN 209641724 U 11/2019
(Continued)

OTHER PUBLICATIONS

Machine translation of KR 20200061909 A (Year: 2019).*
Machine translation of KR 102091770 B1 (Year: 2020).*

*Primary Examiner* — Kevin P Kerns
(74) *Attorney, Agent, or Firm* — BRYAN CAVE LEIGHTON PAISNER LLP

(57) ABSTRACT

A battery module including: a battery cell stack including a plurality of battery cells and electrode leads protruding in mutually opposite directions; a housing that houses the battery cell stack; and a first busbar frame arranged on one surface of the battery cell stack in a protruding direction of the electrode leads. The first busbar frame includes a first venting-preventing part protruding in a direction between the electrode leads of adjacent battery cells.

15 Claims, 15 Drawing Sheets

(51) Int. Cl.

| | |
|---|---|
| ***H01M 50/289*** | (2021.01) |
| ***H01M 50/296*** | (2021.01) |
| ***H01M 50/30*** | (2021.01) |

(58) Field of Classification Search

USPC .......................................................... 429/82

See application file for complete search history.

(56) References Cited

U.S. PATENT DOCUMENTS

| | | | |
|---|---|---|---|
| 2016/0093857 | A1 | 3/2016 | DeKeuster et al. |
| 2018/0212214 | A1 | 7/2018 | Sakai et al. |
| 2019/0131596 | A1 | 5/2019 | Yang et al. |
| 2019/0273243 | A1 | 9/2019 | Motokawa et al. |
| 2020/0381691 | A1 | 12/2020 | Chi et al. |
| 2020/0388814 | A1 | 12/2020 | Jang et al. |
| 2021/0151842 | A1 | 5/2021 | Motokawa et al. |
| 2021/0280949 | A1 | 9/2021 | Kim et al. |
| 2021/0288387 | A1 | 9/2021 | Cho et al. |
| 2022/0181727 | A1 | 6/2022 | Park et al. |

FOREIGN PATENT DOCUMENTS

| | | | |
|---|---|---|---|
| CN | 110770946 | A | 2/2020 |
| EP | 4037082 | A2 | 8/2022 |
| JP | 2002-151025 | A | 5/2002 |
| JP | 2016054127 | A | 4/2016 |
| JP | 2018-195745 | A | 12/2018 |
| KR | 10-2015-0045739 | A | 4/2015 |
| KR | 10-2016-0129820 | A | 11/2016 |
| KR | 10-2020-0008624 | A | 1/2020 |
| KR | 10-2091770 | B1 | 3/2020 |
| KR | 10-2020-0061909 | A | 6/2020 |
| KR | 10-2020-0069041 | A | 6/2020 |
| WO | 2006-059455 | A1 | 6/2006 |
| WO | 2017-013883 | A1 | 1/2017 |
| WO | 2018-100983 | A1 | 6/2018 |
| WO | 2020-075966 | A1 | 4/2020 |

* cited by examiner

PRIOR ART

PRIOR ART

PRIOR ART

BATTERY MODULE AND BATTERY PACK INCLUDING THE SAME

CROSS-REFERENCE TO RELATED APPLICATIONS

This application is a US national phase of international application No. PCT/KR2021/013770 filed on Oct. 7, 2021, and claims the benefit of Korean Patent Application No. 10-2020-0145982 filed on Nov. 4, 2020, the disclosures of which are incorporated by reference in their entirety as if fully set forth herein.

TECHNICAL FIELD

The present disclosure relates to a battery module and a battery pack including the same, and more particularly to a battery module having enhanced safety, and a battery pack including the same.

BACKGROUND

A secondary battery has attracted much attention as an energy source in various products such as a mobile device and an electric vehicle. The secondary battery is a potent energy resource that can replace the use of existing products using fossil fuels, and is in the spotlight as an environment-friendly energy source because it does not generate by-products due to energy use.

Recently, along with a continuous rise in need for a large-capacity secondary battery structure, including the utilization of the secondary battery as an energy storage source, there is a growing demand for a battery pack having a multi-module structure which is an assembly of battery modules in which a plurality of secondary batteries are connected in series or in parallel.

A common method of configuring a battery module composed of a plurality of battery cells including a plurality of battery cells connected in series or in parallel includes adding other components to at least one battery module to configure a battery pack. Since the battery cells constituting these medium- or large-sized battery modules are composed of chargeable/dischargeable secondary batteries, such a high-output and large-capacity secondary battery generates a large amount of heat during a charging and discharging process.

The battery module may include a battery cell stack in which a plurality of battery cells are stacked, a housing for the battery cell stack, and a pair of end plates for covering the front and rear surfaces of the battery cell stack.

FIG. 1 is a perspective view of a conventional battery module.

As illustrated in FIG. 1, the conventional battery module 10 can be manufactured by housing a battery cell stack (not shown) in the housing 20 and then joining the end plate 40 to the open portion of the housing 20. A terminal busbar opening 41H, where a part of the terminal busbar is exposed, and a module connector opening 42H, where a part of the module connector is exposed, can be formed in the end plate 40. The terminal busbar opening 41H is for guiding the high voltage (HV) connection of the battery module 10, and the terminal busbar exposed through the terminal busbar opening 41H can be connected to another battery module or a BDU (battery disconnect unit). The module connector opening 42H is for guiding the LV (Low voltage) connection of the battery module 10, and the module connector exposed through the module connector opening 42H is connected to a BMS (battery management system) and can transmit voltage information, temperature information, or the like of the battery cell.

FIG. 2 is a view of the conventional battery pack in which the battery module of FIG. 1 is mounted at the time of ignition. FIG. 3 is a cross-sectional view along the line A-A' of FIG. 2, which is a cross-sectional view showing the appearance of a flame that affects adjacent battery modules during ignition of a conventional battery module.

As illustrated in FIGS. 1 to 3, the conventional battery module 10 includes a battery cell stack in which a plurality of battery cells 11 are stacked, a housing 20 that houses the battery cell stack, and a pair of end plates 40 that are formed on the front and rear surfaces of the battery cell stack.

When physical, thermal or electrical damage, including overcharging, occurs in the battery cell, the internal pressure of the battery cell 11 increases and exceeds a limit value of the fusion strength of the battery cell 11. In this case, the high-temperature heat, gas, and flame 50 generated in the plurality of battery cells 11 can be discharged to the outside of the battery module 10.

The high-temperature heat, gas and flame 50 may be discharged through the openings 41H and 42H formed in the end plate 40. However, in the battery pack structure in which a plurality of battery modules 10 are arranged so that the end plates 40 face each other, the high-temperature heat, gas and flame 50 ejected from one battery module 10 may affect adjacent battery modules 10. Thereby, the terminal busbar or the like formed on the end plate 40 of the adjacent battery modules may be damaged, and high-temperature heat, gas and flame 50 may enter the interior of the battery module 10 via the openings formed in the adjacent end plates 40 of the battery module 10 to damage other electrical components including the plurality of battery cells 11. In addition, this leads to heat propagation to the adjacent battery modules 10, which causes a chain ignition in the battery pack.

SUMMARY

It is an objective of the present disclosure to provide a battery module capable of dispersing high-temperature heat and flame discharged when an ignition phenomenon occurs in the battery module, and a battery pack including the same.

However, the problem to be solved by embodiments of the present disclosure is not limited to the above-described problems, and can be variously expanded within the scope of the technical idea included in the present disclosure.

According to one aspect of the present disclosure, there is provided a battery module comprising: a battery cell stack in which a plurality of battery cells including electrode leads protruding in mutually opposite directions are stacked; a housing that houses the battery cell stack; and a first busbar frame arranged on one surface of the battery cell stack in a protrusion direction of the electrode leads, wherein the first busbar frame comprises a first venting-preventing part protruding in a direction between the electrode leads of adjacent battery cells.

The first venting-preventing part may fill a space between the electrode leads of adjacent battery cells.

The first busbar frame may include a cushioning member attached to a surface of the first venting-preventing part facing the battery cell stack.

At least one of a busbar, a terminal busbar, and a module connector may be mounted onto the first busbar frame.

The battery module may further include a first end plate that is joined to the housing while covering the first busbar frame, and the first end plate may be formed with an opening where at least one of the terminal busbar and the module connector is exposed.

The battery module may further include a second busbar frame arranged on an opposite surface of the battery cell stack in a direction opposite to the direction of protrusion of the electrode leads.

At least one of a busbar, a terminal busbar, and a module connector may be mounted onto the second busbar frame.

The battery module may further include a second end plate that is joined to the housing while covering the second busbar frame, and the second end plate may be formed with an opening where at least one of the terminal busbar and the module connector is exposed.

The battery module may further include a second end plate that is joined to the housing while covering the second busbar frame, and a venting hole for gas discharge may be formed in the second end plate.

The second busbar frame may include a second venting-preventing part that protrudes in a direction between the electrode leads of adjacent battery cells among the plurality of battery cells.

A gas discharge port may be formed on the upper surface of the housing.

According to embodiments of the present disclosure, a gas discharge-suppressing structure is provided on one surface of the battery cell stack within the battery module, and thus high-temperature heat, gas, flame, and the like, discharged when an ignition phenomenon occurs in the battery module can be discharged in a desired direction. By dispersing high-temperature heat, gas, and flame in this way, damage to the battery module facing the battery module can be minimized.

The effects of the present disclosure are not limited to the effects mentioned above and additional other effects not described above will be clearly understood from the description of the appended claims by those skilled in the art.

DETAILED DESCRIPTION

Figure 1:
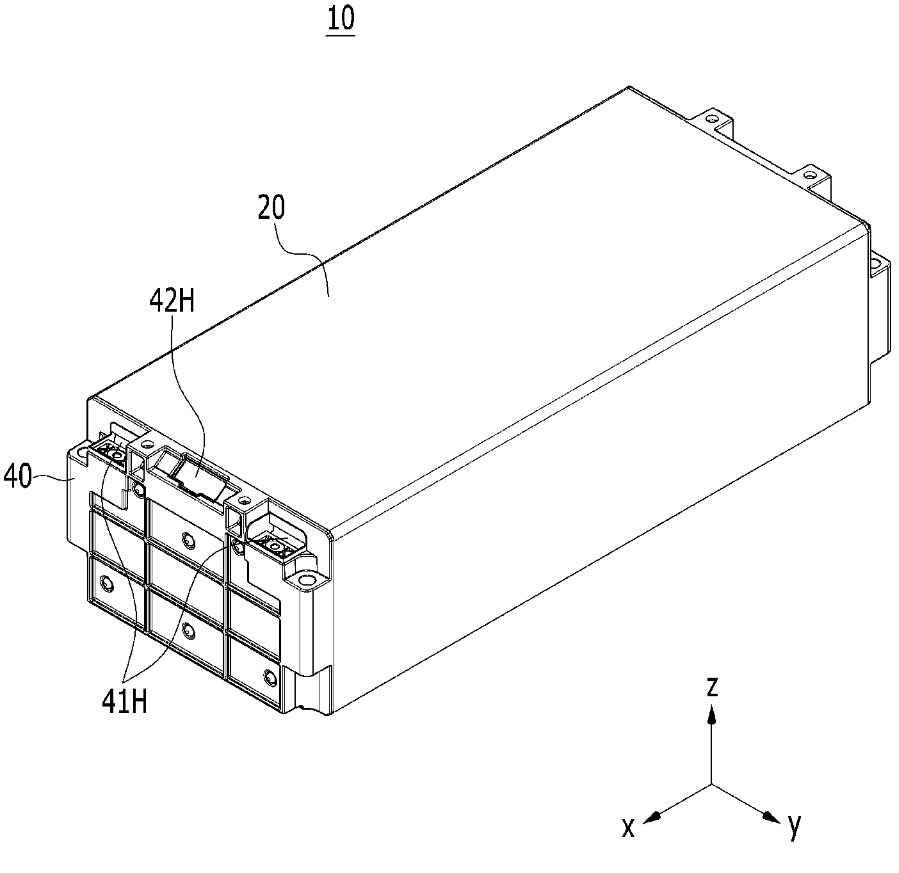
FIG. 1 is a perspective view of a conventional battery module.

Hereinafter, various embodiments of the present disclosure will be described in detail with reference to the accompanying drawings so that those skilled in the art can easily carry out them. The present disclosure may be modified in various different ways, and is not limited to the embodiments set forth herein.

A description of parts not related to the description will be omitted herein for clarity, and like reference numerals designate like elements throughout the description.

Further, in the drawings, the size and thickness of each element are arbitrarily illustrated for convenience of description, and the present disclosure is not necessarily limited to those illustrated in the drawings. In the drawings, the thickness of layers, regions, and the like, are exaggerated for clarity. In the drawings, for convenience of description, the thicknesses of some layers and regions are exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed on the upper end of the reference portion toward the opposite direction of gravity.

Further, throughout the description, when a portion is referred to as "including" a certain component, it means that the portion can further include other components, without excluding the other components, unless otherwise stated.

Further, throughout the description, when referred to as "planar", it means when a target portion is viewed from the upper side, and when referred to as "cross-sectional", it means when a target portion is viewed from the side of a cross section cut vertically.

Figure 4:
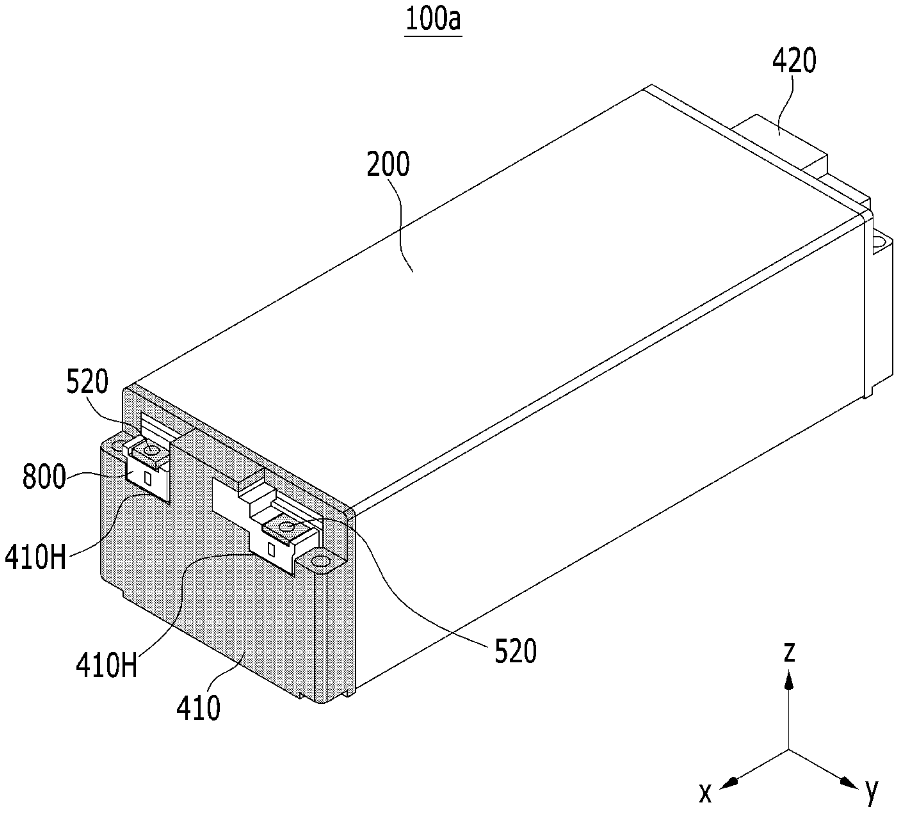
FIG. 4 is a perspective view of a battery module according to an embodiment of the present disclosure.
Figure 5:
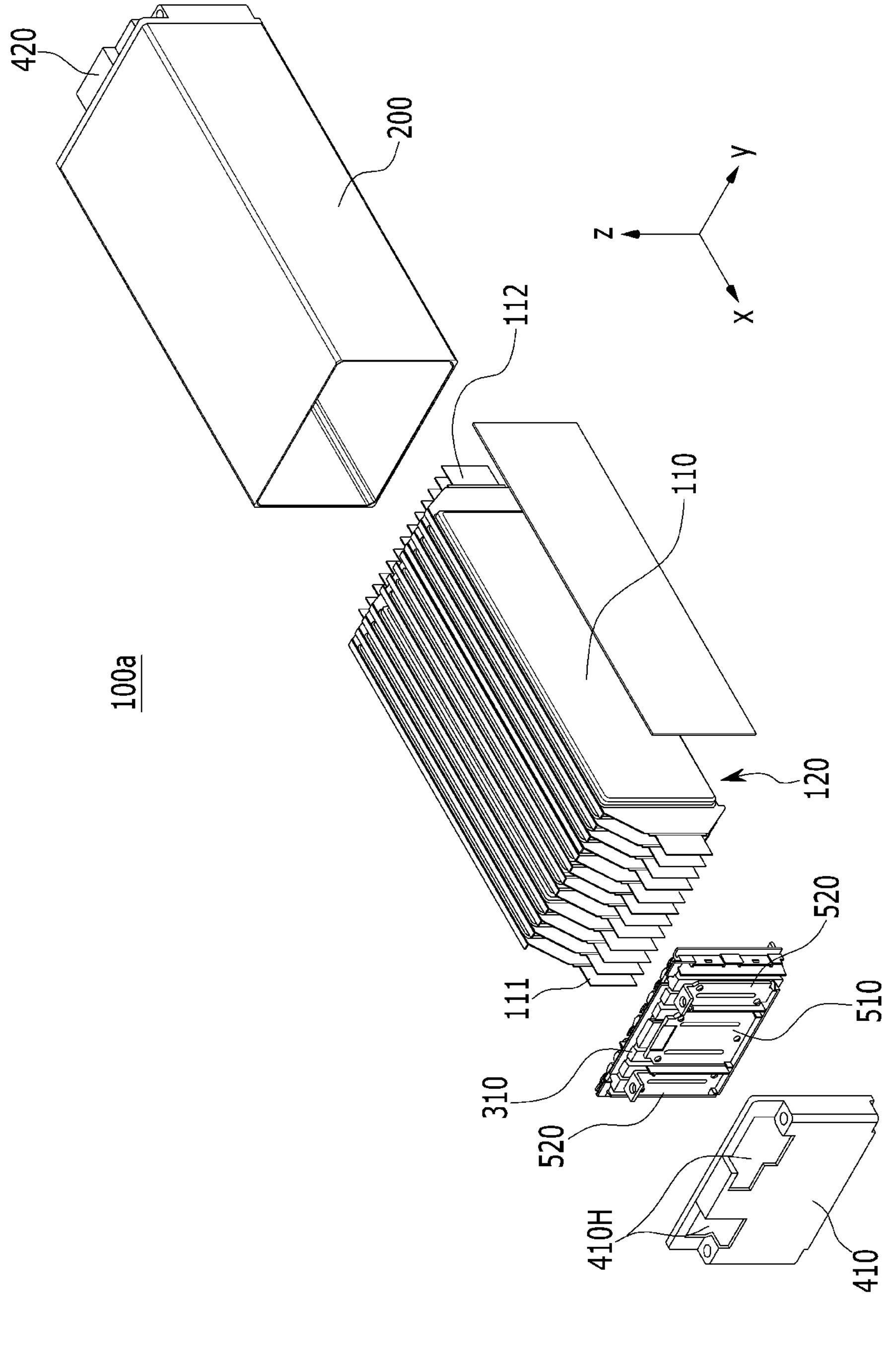
FIG. 5 is an exploded perspective view of the battery module of FIG. 4.
Figure 6:
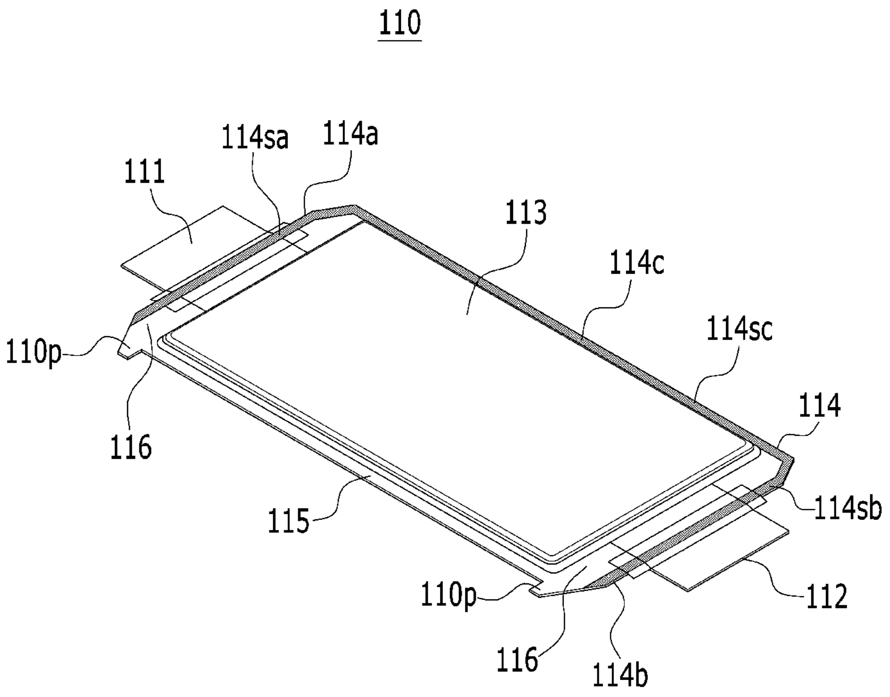
FIG. 6 is a perspective view of a battery cell included in the battery module of FIG. 5.

FIG. 4 is a perspective view of a battery module according to an embodiment of the present disclosure. FIG. 5 is an exploded perspective view of the battery module of FIG. 4. FIG. 6 is a perspective view of a battery cell included in the battery module of FIG. 5.

As illustrated in FIGS. 4 to 6, a battery module 100*a* according to one embodiment of the present disclosure includes a battery cell stack 120 in which a plurality of battery cells 110, each of which includes electrode leads 111 and 112 protruding in mutually opposite directions, are stacked; a housing 200 that houses the battery cell stack 120; and a first busbar frame 310 arranged on one surface of the battery cell stack 120 in a direction of protrusion of the electrode leads 111.

As illustrated in FIG. 6, the battery cell 110 is preferably a pouch-type battery cell. For example, the battery cell 110 according to the present embodiment has a structure in which two electrode leads 111 and 112 are opposite to each other and protrude from one end 114*a* and the other end 114*b* of the cell main body 113, respectively. More specifically, the electrode leads 111 and 112 are connected to an electrode assembly (not shown), and protrude from the electrode assembly (not shown) to the outside of the battery cell 110 in opposite directions.

On the other hand, the battery cell 110 can be manufactured by connecting both end parts 114*a* and 114*b* of the cell case 114 via one side part 114*c*, in a state in which the electrode assembly (not shown) is housed in a cell case 114. In other words, the battery cell 110 according to the present embodiment has a total of three sealing parts 114*sa*, 114*sb* and 114*sc*, the sealing parts 114*sa*, 114*sb* and 114*sc* have a structure sealed by a method such as heat fusion, and the remaining other side part may be formed of a connection part 115. The cell case 114 may be formed of a laminated sheet containing a resin layer and a metal layer.

In addition, the connection part 115 may extend long along one edge of the battery cell 110, and a protrusion part 110*p* of the battery cell 110 called a bat-ear may be formed at an end part of the connection part 115. Further, while the cell case 114 is sealed with the protruding electrode leads 111 and 112 being interposed therebetween, a terrace part 116 may be formed between the electrode leads 111 and 112 and the cell main body 113. That is, the battery cell 110 includes a terrace part 116 formed to extend from the cell case 114 in a protruding direction of the electrode leads 111 and 112.

The battery cell stack 120 may include a plurality of batters cells 110, and the plurality of battery cells 110 may be stacked to be electrically connected to each other, thereby forming the battery cell stack 120. As illustrated in FIG. 5, the plurality of battery cells 110 can be stacked along the y-axis direction to form a battery cell stack 120. A first busbar frame 310 may be located on one surface of the battery cell stack 120 in the protruding direction (x-axis direction) of the electrode leads 111. Although not specifically shown in the figure, a second busbar frame may be located on the opposite surface of the battery cell stack 120 in the protruding direction (−x-axis direction) of the electrode leads 112. The battery cell stack 120 and the first busbar frame 310 may be housed together with the housing 200. The housing 200 can protect the battery cell stack 120 housed inside the housing 200 and the electrical components connected thereto from external physical impacts.

A thermal conductive resin may be injected between the battery cell stack 120 and the lower surface of the housing 200, and a thermal conductive resin layer (not shown) may be formed between the battery cell stack 120 and the lower part of the housing 200.

On the other hand, the housing 200 can be open in the protruding direction of the electrode leads 111 and 112 (x-axis direction, −x-axis direction), and a first end plate 410 and a second end plate 420 may be located on opposite open sides of the housing 200, respectively. The first end plate 410 can be joined to the housing 200 while covering the first busbar frame 310, and the second end plate 420 can be joined to the housing 200 while covering the second busbar frame (not shown). That is, a first busbar frame 310 may be located between the first end plate 410 and the battery cell stack 120, and a second busbar frame (not shown) may be located between the second end plate 420 and the battery cell stack 120. Further, an insulating cover 800 (see FIG. 4) for electrical insulation may be located between the first end plate 410 and the first busbar frame 310.

The first end plate 410 and the second end plate 420 are located to cover opposite surfaces of the battery cell stack 120, respectively. The first end plate 410 and the second end plate 420 can protect the first busbar frame 310 and various electrical components connected thereto from external impacts. For this purpose, they must have a predetermined strength and may include a metal such as aluminum. Further, the first end plate 410 and the second end plate 420 may be joined to a corresponding edge of the housing 200, respectively, by a method such as welding.

Next, the structures of the first busbar frame and the first venting-preventing part according to an embodiment of the present disclosure will be described in detail with reference to FIGS. 7 to 10.

Figure 7:
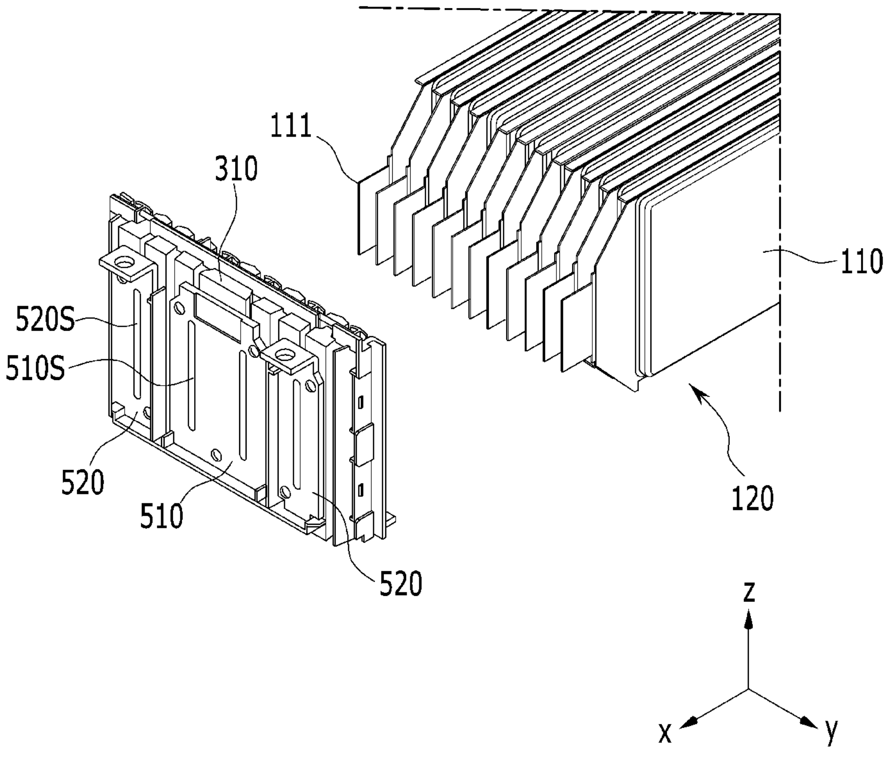
FIG. 7 is a partial perspective view of a first busbar frame and a plurality of battery cells according to an embodiment of the present disclosure.
Figure 8:
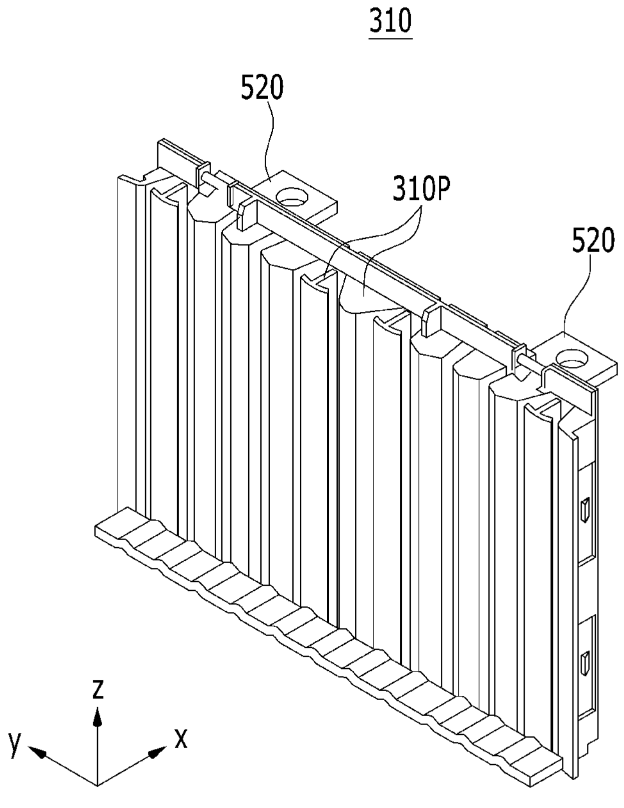
FIG. 8 is a perspective view of a surface of the first busbar frame of FIG. 7 facing the plurality of battery cells at different angles.
Figure 9:
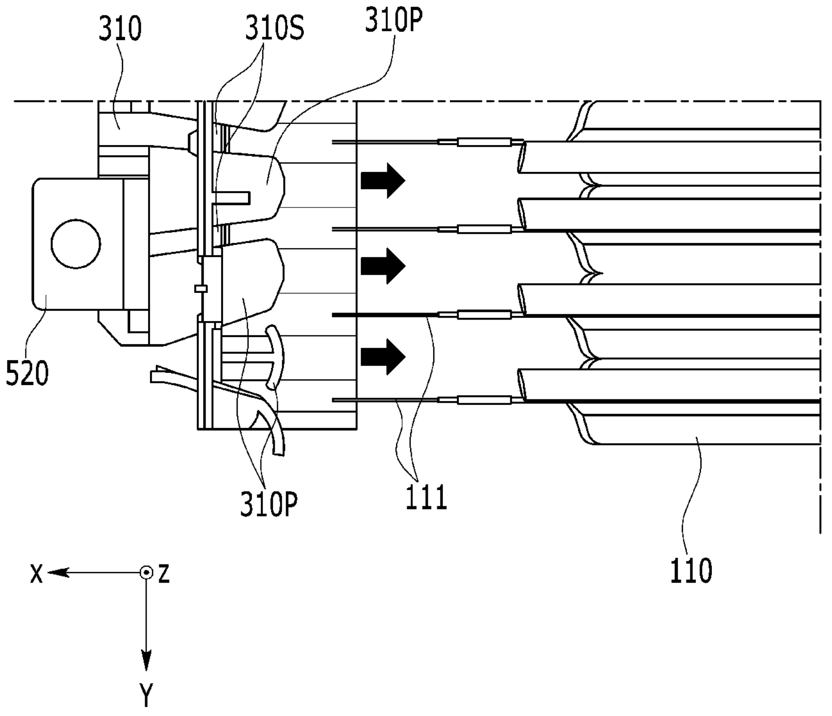
FIG. 9 is a partial plan view of the first busbar frame and battery cells of FIG. 7 as viewed from the xy plane in the −Z axis direction.
Figure 10:
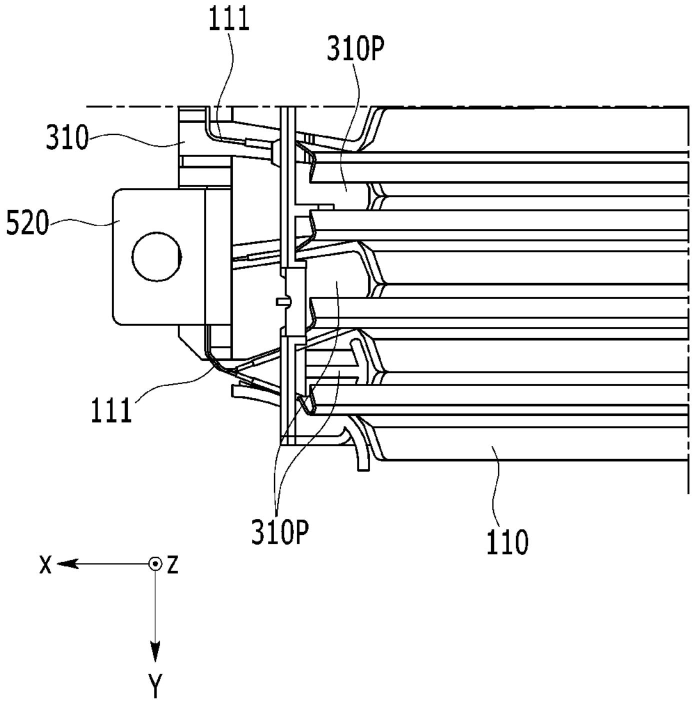
FIG. 10 is a partial plan view of the first busbar frame combined with the plurality of battery cells of FIG. 9.

FIG. 7 is a partial perspective view of a first busbar frame and battery cells according to an embodiment of the present disclosure. FIG. 8 is a perspective view of a surface of the first busbar frame of FIG. 7 facing the battery cells at different angles. FIG. 9 is a partial plan view of the first busbar frame and the plurality of battery cells of FIG. 7 as viewed from the xy plane in the −Z axis direction. FIG. 10 is a partial plan view of the combination of the first busbar frame and battery cells of FIG. 9.

As illustrated in FIGS. 7 and 8, the first busbar frame 310 according to the present embodiment includes a first venting-preventing part 310P that protrudes in a direction between the electrode leads 111 of adjacent battery cells 110 from among the plurality of battery cells 110.

The first busbar frame 310 can be located on one surface of the battery cell stack 120 to cover the battery cell stack 120 and at the same time, guide the connection between the battery cell stack 120 and external devices. Specifically, at least one of a busbar, a terminal busbar, and a module connector may be mounted onto the first busbar frame 310. Particularly, at least one of a busbar, a terminal busbar, and a module connector may be mounted onto a surface opposite to the surface of the first busbar frame 310 facing the battery cell stack. As an example, FIG. 7 the busbar 510 and the terminal busbar 520 mounted on the first busbar frame 310.

As shown in FIGS. 9 and 10, the electrode lead 111 of each of the battery cells 110 is bent after passing through a slit 310S formed in the first busbar frame 310 and can be joined to the busbar 510 or the terminal busbar 520. Further, the electrode lead 111 is bent after passing through a slit 510S formed in the busbar 510 or a slit 520S (see FIG. 7) formed in the terminal busbar 510 and can joined to the busbar 510 or the terminal busbar 520.

The plurality of battery cells 110 constituting the battery cell stack 120 may be connected in series or in parallel by the busbar 510 or the terminal busbar 520, and the plurality of battery cells 110 can be electrically connected to an external device or circuit through the terminal busbar 520 exposed to the outside of the battery module 100*a*.

The first busbar frame 310 may include an electrically insulating material. The first busbar frame 310 restricts the busbar 510 or the terminal busbar 520 from making contact with the plurality of battery cells 110, except for the portion where the busbar 510 or the terminal busbar 520 is joined to the respective electrode leads 111, thereby preventing the occurrence of a short circuit.

On the other hand, as described above, the second busbar frame may be located on an opposite surface of the battery cell stack 120, and at least one of the busbar, terminal busbar, and module connector may be mounted onto the second busbar frame. Electrode leads 112 can be joined to such a busbar.

As shown in FIGS. 8 to 10, a first venting-preventing part 310P protrudes from the first busbar frame 310, and the first venting-preventing part 310P in a direction between the electrode leads 111 of adjacent battery cells 110 among the plurality of battery cells 110. A plurality of first venting-preventing part 310P can be provided to protrude in a direction between the respective battery cells 110. As shown in FIG. 10, the first venting-preventing part 310P may fill a space between the electrode leads 111 of adjacent battery cells 110. In other words, the first venting-preventing part 310P may be positioned adjacent to a terrace part 116 (see FIG. 6) of the battery cell 110.

Each of the battery cells 110 may generate a gas inside by a decomposition reaction of a material and a plurality of side reactions. In the case of a battery cell 110 which is a pouch-type secondary battery, a swelling phenomenon may occur in which the cell case 114 (see FIG. 6) of the laminated sheet is stretched and swells in a convex shape due to the gas generated inside the battery cell 110.

However, when the plurality of battery cells 110 form the battery cell stack 120, it is difficult for the cell body 113 of each of the battery cells 110 to swell because the battery cells 110 are compressed against each other. Instead, gas is concentrated in a region corresponding to the terrace part 116 in the direction in which the electrode leads 111 and 112 protrude, and excessive swelling phenomenon may occur in the terrace part 116. The initial sealing of the terrace part 116 may be released, and the high-temperature heat, gas, and flame from the plurality of battery cells 110 are usually discharged in the direction in which the electrode leads 111 and 112 protrude (x-axis direction, −x-axis direction, see FIGS. 5 and 7).

Therefore, the first busbar frame 310 according to the present embodiment is provided with a first venting-preventing part 310P, which can prevent the gas generated inside the battery cells 110 and the internal gas caused by the gas from accumulating near the terrace part 116, and may serve to guide the venting gas and the flame to be discharged in a desired direction. That is, the first venting-preventing part 310P can restrict the high-temperature heat, gas, and flame caused from the battery cells 110 from being discharged in the direction in which the first busbar frame 310 and the first end plate 410 are located.

As illustrated in FIGS. 4 and 5, an opening in which at least one of the terminal busbar and the module connector is exposed can be formed in the first end plate 410 according to the present embodiment. The opening may be a terminal busbar opening or a module connector opening. In one example, as shown in FIGS. 4 and 5, a terminal busbar opening 410H where the terminal busbar 520 is exposed can be formed in the first end plate 410. The terminal busbar 520 further includes an upwardly protruding portion compared with the busbar 510. Such upwardly protruding portion may be exposed to the outside of the battery module 100*a* via the terminal busbar opening 410H. The terminal busbar 520 exposed via the terminal busbar opening 410H may be connected to another battery module or a battery disconnect unit (BDU) to form a high voltage (HV) connection. FIGS. 4 and 5 are exemplary structures, and a module connector may be mounted onto the first busbar frame 310 according to another embodiment of the present disclosure, whereby the module connector opening may be formed in the first end plate 410.

Figure 11:
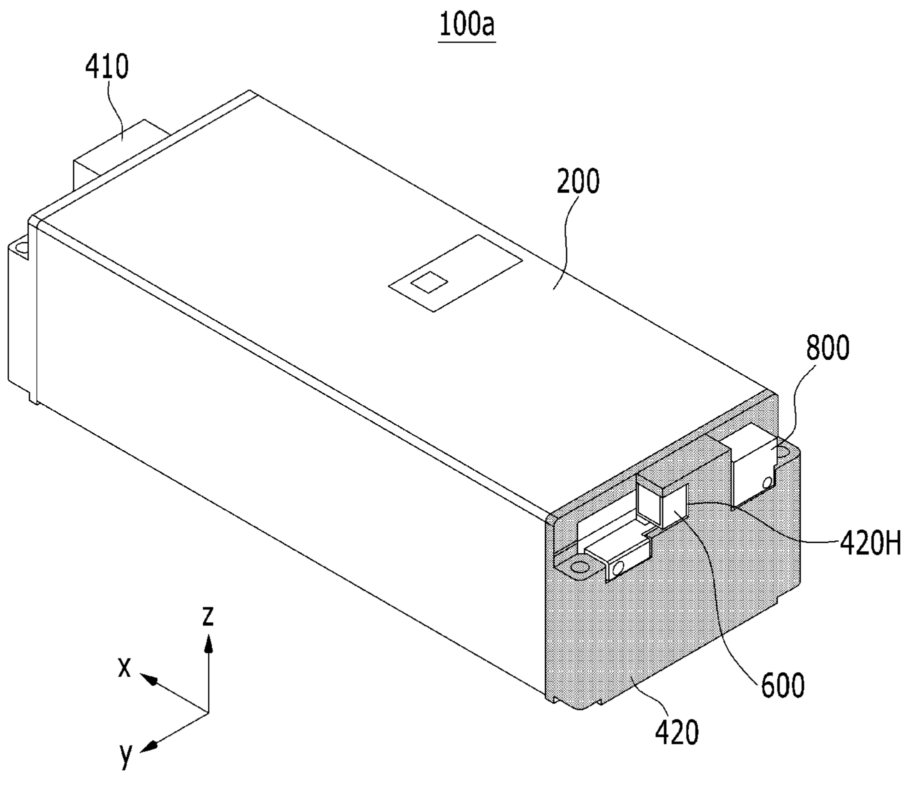
FIG. 11 is a perspective view of the second end plate of the battery module of FIG. 4 when viewed at different angles from the front.

FIG. 11 is a perspective view of the second end plate of the battery module of FIG. 4 when viewed from the front at different angles.

As illustrated in FIG. 11, an opening where at least one of a terminal busbar and a module connector is exposed may be formed in the second end plate 420 according to the present embodiment. The opening may be a terminal busbar opening or a module connector opening. As an example, as shown in FIG. 11, a module connector opening 420H where the module connector 600 is exposed may be formed in the second end plate 420. This means that the module connector 600 is mounted on the above-mentioned second busbar frame. However, FIG. 11 is an exemplary structure, and according to another embodiment of the present disclosure, a terminal busbar may be mounted onto the second busbar frame, whereby a terminal busbar opening may be formed in the second end plate 420.

Meanwhile, although not specifically shown in the figure, the module connector 600 can be connected to a temperature sensor, a voltage measuring member, or the like provided inside the battery module 100*a*. Such a module connector 600 is connected to an external BMS (battery management system) to form an LV (Low voltage) connection, and it performs a function of transmitting temperature information, voltage level and the like measured by the temperature sensor or the voltage measuring member to the external BMS.

Figure 2:
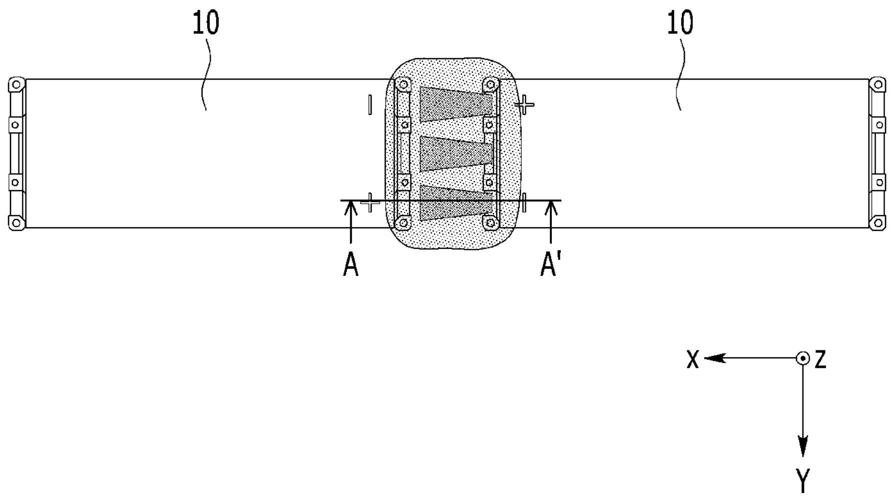
FIG. 2 is an illustration of the conventional battery pack in which the battery module of FIG. 1 is mounted at the time of ignition.
Figure 3:
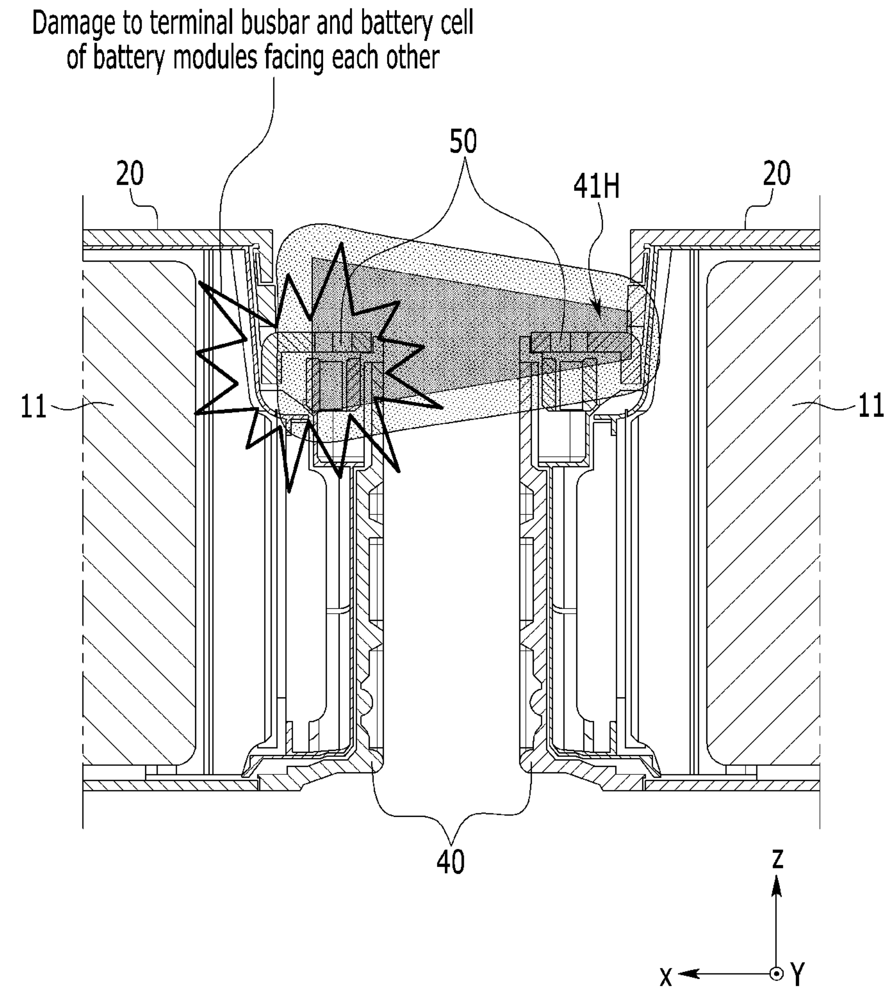
FIG. 3 is a cross-sectional view along the line A-A' of FIG. 2.

As illustrated in FIGS. 1 to 3, in the case of the conventional battery module 10, high-temperature heat, gas, flame, and the like ejected through the openings 41H and 42H of the battery module 10 may affect adjacent battery modules 10. In particular, adjacent battery modules 10 with terminal busbars facing each other for HV connection may cause damage to the terminal bus bar or other electrical components including the battery cell 11.

Unlike the conventional case, the battery module 100*a* according to the present embodiment includes the first venting-preventing part 310P formed on the first busbar frame 310, and thus can restrict the high-temperature heat, gas and flame, and the like emitted from the battery cell 110 from being discharged through the opening of the first end plate 410, for example, the terminal busbar opening 410H. Thereby, damage to adjacent battery modules and HV connection structures can be greatly reduced.

As the gas discharge is suppressed by the first venting-preventing part 310P, heat, gas and flame, and the like inside the battery module 100*a* may be discharged in the −x-axis direction through an opening formed in the second end plate 420, for example, through the module connector opening 420H (see FIG. 11). That is, as an exemplary form, flame diffusion and the like can be minimized by guiding a venting gas and a flame in the direction of the LV connection structure instead of the direction of the HV connection structure. In this case, the terminal busbar opening 410H and the module connector opening 420H may be formed in mutually opposite directions with respect to the battery module 100*a* to set the venting gas discharge path as above.

Figure 12:
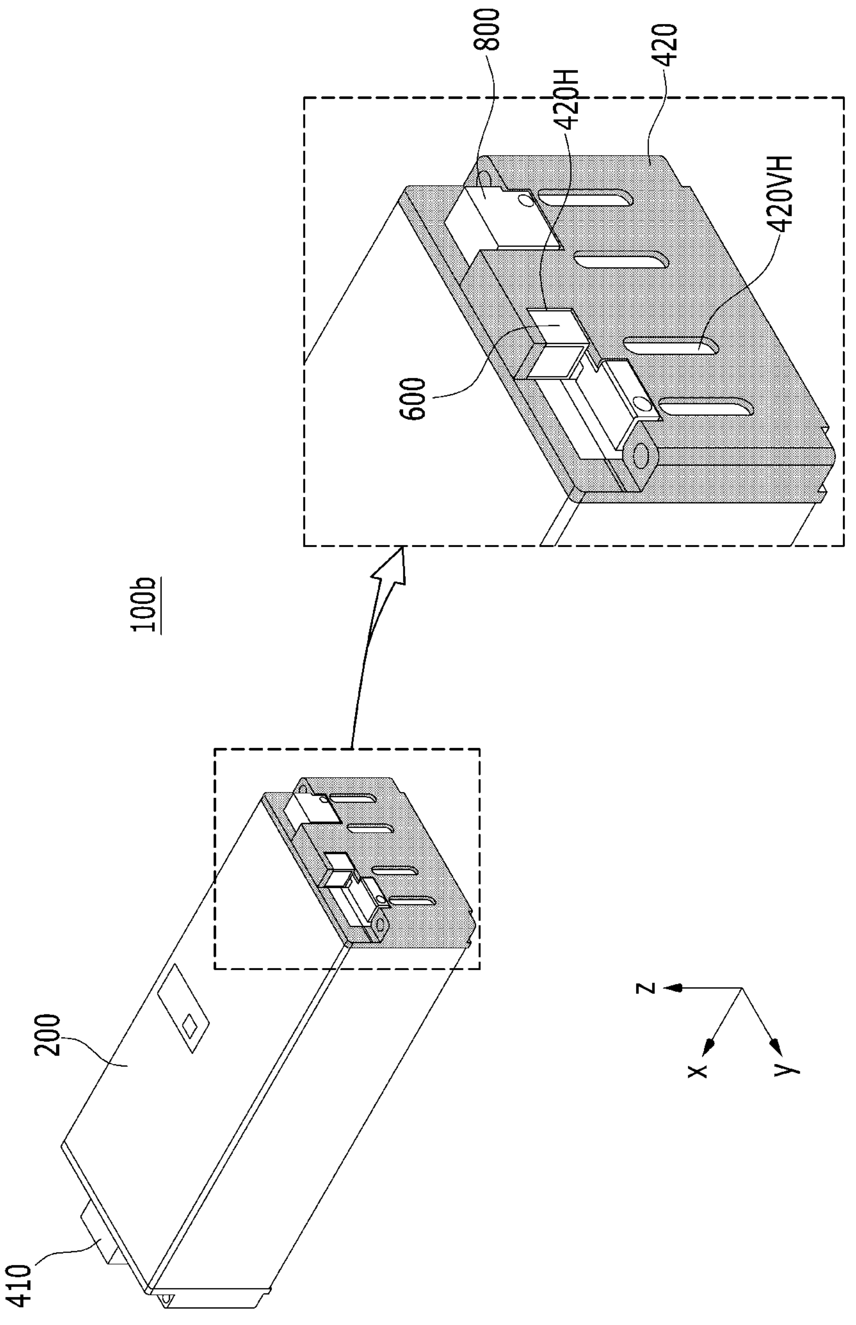
FIG. 12 is a perspective view of a battery module according to a modified embodiment of the present disclosure.

FIG. 12 is a perspective view of a battery module according to a modified embodiment of the present disclosure. In particular, the appearance of the second end plate facing forward is similar to that in FIG. 11.

As illustrated in FIG. 12, the battery module 100*b* according to a modified embodiment of the present disclosure may include a housing 200, a first end plate 410 and a second end plate 420. The battery module 100*b* according to the present embodiment may include a first busbar frame including a first venting-preventing part, similar to the battery module 100*a* described above. A detailed description will be omitted because it overlaps with those described above.

At this time, a venting hole 420VH may be formed in the second end plate 420 according to the present embodiment. Further, an insulating cover 800 may be located between the second busbar frame and the second end plate 420, and in such an insulating cover 800, a venting hole may be similarly formed in a portion corresponding to the venting hole 420VH of the second end plate 420.

In the present embodiment, the venting hole 420VH is formed in the second end plate 420 together with the configuration of the first venting-preventing part described above, whereby the gas whose discharge is restricted by the first venting-preventing part can be guided to be discharged through the venting hole 420VH. That is, as an example, as shown in FIG. 12, heat, gas, and flame inside the battery module 100*b* can be discharged in the −x-axis direction not only through the module connector opening 420H but also through the venting hole 420VH formed in the second end plate 420. FIG. 12 shows that the four venting holes 420VH are formed along the z-axis direction, but the number or shape thereof is not particularly limited.

On the other hand, as illustrated in FIGS. 8 and 9, the first venting-preventing part 310P may have a kind of an arrow shape or a block shape that occupies a certain space. The arrow shape means a configuration in which a plate-shaped member is extended and two curved members are extended from one end of the plate-shaped member, similarly to the first venting-preventing part 310P located at the extreme end of the y-axis direction in FIG. 9. The block shape means a bulky and protruding configuration that occupies a certain space between the electrode leads 111, similarly to the first venting-preventing part 310P located on the first venting-preventing part 310P in the form of an arrow in FIG. 9. These first venting-preventing parts 310P are exemplary structures, and if they are formed in a shape corresponding to their shape between the electrode leads 111 of the battery cells 110 and the gas path can be restricted, the shape thereof is not particularly limited.

Next, a battery module 100*c* according to a modified embodiment of the present disclosure will be described in detail with reference to FIGS. 13 and 14.

Figure 13:
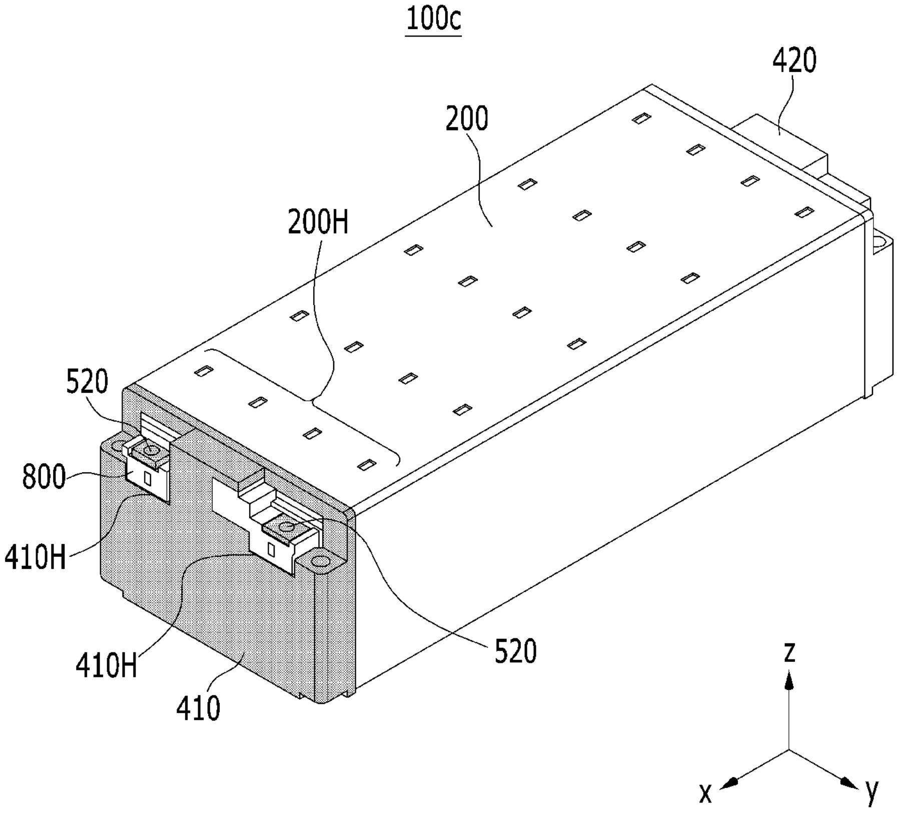
FIG. 13 is a perspective view of a battery module according to a modified embodiment of the present disclosure.
Figure 14:
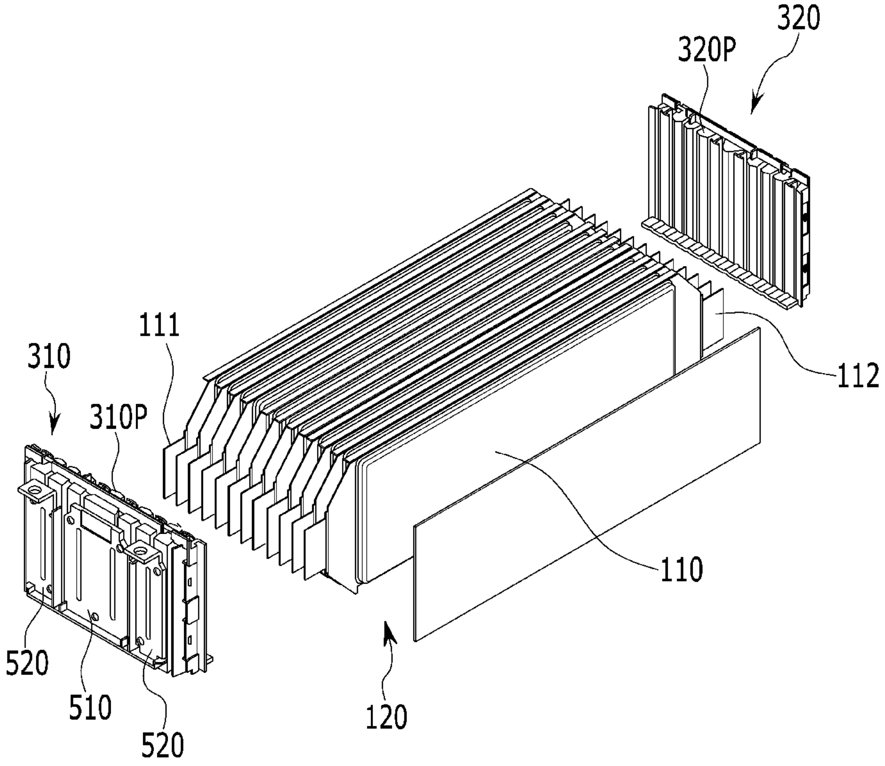
FIG. 14 is a perspective view of a first busbar frame, a second busbar frame, and a battery cell stack included in the battery module of FIG. 13.

FIG. 13 is a perspective view of a battery module according to a modified embodiment of the present disclosure. FIG. 14 is a perspective view of a first busbar frame, a second busbar frame, and a battery cell stack included in the battery module of FIG. 13.

The battery module 100*c* according to a modified embodiment of the present disclosure may include a battery cell stack 120 in which a plurality of battery cells 110 are stacked, a first end plate 410, a second end plate 420 and a housing 200. The first end plate 410 may be joined to the housing 200 while covering the first busbar frame 310, and the second end plate 420 may be joined to the housing 200 while covering the second busbar frame 320.

The battery module 100*c* according to this embodiment may include a first busbar frame 310 arranged on one surface of the battery cell stack 120 in a direction (x-axis direction) of protrusion of the electrode leads 111, and a second busbar frame 320 arranged on the other surface of the battery cell stack 120 in a direction (−x-axis direction) of protrusion of the electrode leads 112. That is, the first busbar frame 310 may be located between the first end plate 410 and the battery cell stack 120, and a second busbar frame 320 may be located between the second end plate 420 and the battery cell stack 120. At least one of a busbar, a terminal busbar, and a module connector may be mounted onto the first busbar frame 310, and at least one of a busbar, a terminal busbar, and a module connector may also be mounted onto the second bus bar frame 320. As an example, the busbar 510 and the terminal busbar 520 may be mounted onto the first busbar frame 310. Although not specifically shown in the figure, a busbar and a module connector 600 (see FIG. 11 or 12) may be mounted onto the second busbar frame 320. Each of the electrode leads 111 protruding in the x-axis direction is bent after passing through the slit formed in the first busbar frame 310 and can be joined to the busbar 510 or the terminal busbar 520, and each of the electrode leads 112 protruding in the −x-axis direction is bent after passing through a slit formed in the second busbar frame 320 and can be joined to the busbar.

The first busbar frame 310 may include a first venting-preventing part 310P protruding in a direction between the electrode leads 111 of adjacent battery cells 110 among the plurality of battery cells 110. The second busbar frame 320 may include a second venting-preventing part 320P protruding in a direction between the electrode leads 112 of the adjacent battery cells 110 among the plurality of battery cells 110. That is, the first venting-preventing part 310P may be formed on the surface of the first busbar frame 310 that faces the battery cell stack 120, and a second venting-preventing part 320P may be formed on a surface of the second busbar frame 320 that faces the battery cell stack 120. Specific structures of the first venting-preventing part 310P and the second venting-preventing part 320P may be similar to or identical to those described above with reference to FIGS. 7 to 10. A detailed description will be omitted since it overlaps with those described above.

Each of the first end plate 410 and the second end plate 420 may be formed with an opening wherein at least one of the terminal busbar and the module connector is exposed. The opening may be a terminal busbar opening or a module connector opening. As an example, a terminal busbar opening 410H where the terminal busbar 520 is exposed may be formed in the first end plate 410, and a module connector opening 420H (see FIG. 11 or FIG. 12) where the module connector is exposed may be formed in the second end plate 420. The battery module 100*c* according to the present embodiment is provided with a first busbar frame 310 in which a first venting-preventing part 310P is formed and a second busbar frame 320 in which a second venting-preventing part 320P is formed, whereby it is possible to suppress the high temperature heat, gas, flame, and the like discharged through the terminal busbar opening 410H or the module connector opening 420H. That is, it is possible to minimize the discharge of venting gas and flames in both the direction of the HV connection structure and the direction of the LV connection structure.

A gas discharge port 200H may be formed on the upper surface of the housing 200 according to the present embodiment. In particular, a plurality of gas discharge ports 200H may be arranged at regular intervals and distributed over the entire upper surface of the housing 200. The venting gas or flame generated inside the battery module 100*c* is not discharged toward the first end plate 410 or the second end plate 420 by the first venting-preventing part 310P and the second venting-preventing part 320P, and instead, it may be discharged in the upper direction (z-axis direction) of the battery module 100*c* through the gas discharge port 200H. As described above, the battery module 100*c* according to the present embodiment includes the housing 200 in which the first venting-preventing part 310P, the second venting-preventing part 320P and the gas discharge port 200H are formed, whereby the influence of venting gas or flame on adjacent battery modules can be minimized, and flame diffusion can be effectively suppressed.

Figure 15:
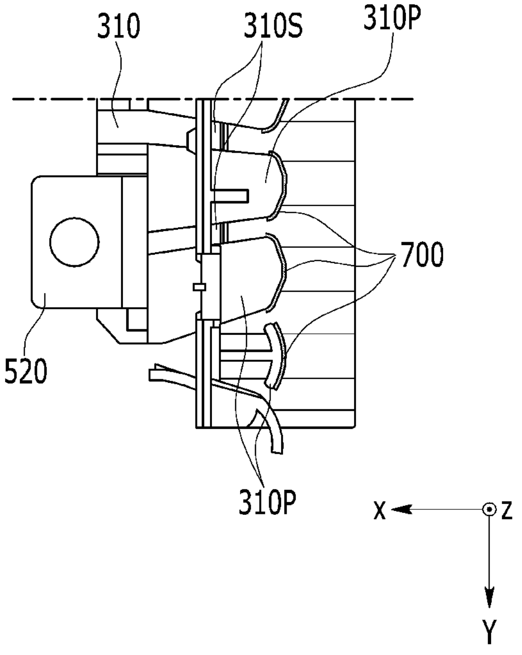
FIG. 15 is a partial plan view of a first busbar frame to which a cushioning member is attached according to a modified embodiment of the present disclosure.

FIG. 15 is a partial plan view of a first busbar frame to which a cushioning member is attached according to a modified embodiment of the present disclosure. In particular, FIG. 15 shows the first busbar frame 310 at the same angle as FIGS. 9 and 10.

As illustrated in FIG. 15, the first busbar frame 310 may include a cushioning member 700 attached to a surface of the first venting-preventing part 310P facing the battery cells 110. By attaching the cushioning member 700, it is possible to absorb the tolerances of individual members and the assembling tolerance, and to absorb physical damage that may occur when a portion of the first busbar frame 310 directly contacts the battery cell 110. The cushioning member 700 may include at least one of PU (polyurethane) foam and silicone foam.

On the other hand, according to another embodiment of the present disclosure, in consideration of the tolerance of individual members or the prevention of physical damage, the first venting-presenting part 310P may be arranged to have a predetermined distance from the battery cells 110.

The terms representing directions such as the front side, the rear side, the left side, the right side, the upper side, and the lower side have been used in embodiments of the present disclosure, but the terms used are provided simply for convenience of description and may become different according to the position of an object, the position of an observer, or the like.

The one or more battery modules according to embodiments of the present disclosure described above can be mounted together with various control and protection systems such as a battery management system (BMS) and a cooling system to form a battery pack.

The battery module or the battery pack can be applied to various devices. For example, it can be applied to vehicle means such as an electric bike, an electric vehicle, and a hybrid electric vehicle, and may be applied to various devices capable of using a secondary battery, without being limited thereto.

The present disclosure has been described in detail with reference to exemplary embodiments thereof, but the scope of the present disclosure is not limited thereto and modifications and improvements made by those skilled in the part by using the basic concept of the present disclosure, which are defined in the following claims, also belong to the scope of the present disclosure.

The invention claimed is:

1. A battery module comprising:

a battery cell stack comprising a plurality of battery cells, wherein each of the plurality of battery cells comprises a pair of electrode leads protruding in opposite directions;

a housing for the battery cell stack; and a first busbar frame arranged on a first surface of the battery cell stack in a first protruding direction of the electrode leads, wherein the first busbar frame comprises a first venting-preventing part comprising a first plate-shaped member protruding between the electrode leads of adjacent battery cells of the plurality of battery cells, wherein the first venting-preventing part is configured to restrict discharge of gas from the battery cells in the first protruding direction, wherein the first venting-preventing part protrudes toward a terrace part of each battery cell, and wherein the first venting-preventing part fills a space between corresponding electrode leads of adjacent battery cells and is configured to guide the gas to be discharged in a direction opposite to the first protruding direction.

2. The battery module according to claim 1, wherein:

the first busbar frame comprises a cushioning member attached to a surface of the first venting-preventing part facing the battery cell stack.

3. The battery module according to claim 1, wherein:

the first busbar frame further comprises at least one of a busbar, a terminal busbar, and a module connector mounted on the first busbar frame.

4. The battery module according to claim 3, wherein:

the battery module further comprises a first end plate covering the first busbar frame, the first end plate is joined to the housing, and the first end plate comprises an opening where at least one of the terminal busbar and the module connector is exposed.

5. The battery module according to claim 1, wherein:

the battery module further comprises a second busbar frame arranged on a second surface of the battery cell stack, wherein the second surface is in a second protruding direction of the electrode leads, and the second protruding direction is opposite to the first protruding direction of the electrode leads.

6. The battery module according to claim 5, wherein:

the second busbar frame comprises at least one of a busbar, a terminal busbar, and a module connector mounted on the second busbar frame.

7. The battery module according to claim 6, wherein:

the battery module further comprises a second end plate covering the second busbar frame, and the second end plate comprises an opening where at least one of the terminal busbar and the module connector is exposed.

8. The battery module according to claim 6, wherein:

the battery module further comprises a second end plate covering the second busbar frame, the second end plate is joined to the housing, and the second end plate comprises a venting hole for gas discharge.

9. The battery module according to claim 5, wherein:

the second busbar frame comprises a second venting-preventing part comprising a second plate-shaped member protruding in a direction between the electrode leads of adjacent battery cells of the plurality of battery cells, wherein the second venting-preventing part is configured to restrict discharge of gas from the battery cells in the second protruding direction.

10. The battery module according to claim 9, wherein:

the second busbar frame comprises at least one of a busbar, a terminal busbar, and a module connector mounted on the second busbar frame.

11. The battery module according to claim 10, wherein:

the battery module further comprises a second end plate covering the second busbar frame, the second end plate is joined to the housing, and the second end plate comprises an opening where at least one of the terminal busbar and the module connector is exposed.

12. The battery module according to claim 9, wherein the second venting-preventing part further comprises second curved members that extend from one end of the second plate-shaped member.

13. The battery module according to claim 1, wherein:

an upper surface of the housing comprises a gas discharge port.

14. The battery module according to claim 1, wherein the first venting-preventing part further comprises first curved members that extend from one end of the first plate-shaped member.

15. A battery pack comprising the battery module according to claim 1.

* * * * *